(12) United States Patent
Retallick

(10) Patent No.: US 6,620,761 B1
(45) Date of Patent: Sep. 16, 2003

(54) CATALYST COMPRISING PALLADIUM AND ZIRCONIA

(75) Inventor: William B. Retallick, West Chester, PA (US)

(73) Assignee: Catacel Corp., Leavittsburg, OH (US)

( * ) Notice: Subject to any disclaimer, the term of this patent is extended or adjusted under 35 U.S.C. 154(b) by 0 days.

(21) Appl. No.: 10/375,810

(22) Filed: Feb. 27, 2003

(51) Int. Cl.$^7$ .................... B01J 31/00; B01J 31/28; B01J 27/252; B01J 3/42

(52) U.S. Cl. .................. 502/201; 502/162; 502/164; 502/167; 502/339

(58) Field of Search ................ 502/162, 164, 502/167, 201, 339

(56) References Cited

U.S. PATENT DOCUMENTS 5,061,464 A * 10/1991 Cordonna et al. ....... 423/213.5

* cited by examiner

Primary Examiner—Elizabeth D. Wood
(74) Attorney, Agent, or Firm—William H. Ellberg

(57) ABSTRACT

A catalyst composition which includes palladium and zirconium is formed as a suspension which can be coated onto a metal strip. The composition is formed by combining palladium nitrate with a solution of an alkyl ammonium hydroxide, and mixing the combination with a hydrous zirconium oxide, to form the suspension. The alkyl ammonium hydroxide is preferably tetramethylammonium hydroxide or tetrabutylammonium hydroxide. Nitric acid may be added to the palladium nitrate. The resulting composition shows superior activity and good adhesion to a metal strip. The composition can catalyze a combustion reaction, as well as a steam reforming reaction.

24 Claims, 3 Drawing Sheets

CATALYST COMPRISING PALLADIUM AND ZIRCONIA

BACKGROUND OF THE INVENTION

This invention relates to the field of catalytic combustion, and provides a catalyst coating that adheres well to a metal strip used to construct a catalytic combustor.

The catalyst of the present invention is intended for use in promoting the combustion of methane to yield carbon dioxide and water, but it may also have other applications, such as in catalyzing a steam reforming reaction, and/or a water-gas shift reaction.

It has been known to combine palladium and zirconia in a catalyst formulation. The present invention provides an improved catalyst composition which includes palladium and zirconia, and which has high catalytic activity. The catalyst of the present invention also makes it possible to use palladium nitrate from a variety of sources.

SUMMARY OF THE INVENTION

The present invention comprises a catalyst composition which includes palladium and zirconium, and a method of making that composition. The method comprises combining a solution of palladium nitrate with a solution of an alkyl ammonium hydroxide, and mixing the result with a hydrous zirconium oxide so as to form a suspension. The alkyl ammonium hydroxide may be tetramethylammonium hydroxide or tetrabutylammonium hydroxide. More generally, the alkyl may be selected from the group consisting of tetraethyl, tetramethyl, tetrabutyl, and tetraethanol.

The invention also includes the composition made according to the above-described method.

It is preferred that the composition also include nitric acid, in an amount such that the number of mols of nitric acid is approximately equal to the number of mols of the alkyl ammonium hydroxide.

Also, the amount of alkyl ammonium hydroxide in the composition of the present invention is preferably such that the ratio of mols of alkyl ammonium hydroxide to mols of palladium is in the range of about 1 to about 6.

The ratio of weight of palladium to weight of zirconium, in the composition of the present invention, is preferably in the range of about 0.04 to about 0.20.

The invention therefore has the primary object of providing a catalyst composition, and a method of making the catalyst composition, for use in catalyzing combustion, and/or for use in catalyzing other reactions such as steam reforming and water-gas shift reactions.

The invention has the further object of providing a catalyst containing palladium and zirconium, wherein the catalyst adheres well to a metal surface.

The invention has the further object of providing a catalyst as described above, wherein the catalyst exhibits a high level of activity.

The invention has the further object of providing a catalyst containing palladium and zirconium, wherein the palladium can be derived from palladium nitrate obtained from a variety of sources.

The reader skilled in the art will recognize other objects and advantages of the present invention, from a reading of the following brief description of the drawings, the detailed description of the invention, and the appended claims.

DETAILED DESCRIPTION OF THE INVENTION

The present invention includes a suspension containing palladium and zirconium, to which there is added an alkyl ammonium hydroxide, such as tetramethylammonium hydroxide (TMA). The palladium appears in the form of a solution of palladium nitrate, and the zirconium preferably appears in the form of zirconium oxide. The suspension forms a washcoat which can be applied, such as by painting or spraying, to the surface of a metal strip which acts as the catalyst support.

EXAMPLE 1

A catalyst coating according to one preferred embodiment of the present invention was made in the following way. The starting materials were a solution of zirconium oxynitrate ($ZrO(NO_3)_2$), a solution of palladium nitrate, and a solution of tetramethylammonium hydroxide (TMA).

Ammonium hydroxide was added to the solution of $ZrO(NO_3)_2$ to raise the pH to a value between 4 and 5. This precipitated a hydrous zirconium oxide, which was collected on a filter.

Meanwhile, TMA was added to the palladium nitrate. In various iterations of this Example 1, summarized in the table set forth below, the amounts of added TMA ranged from about 1.2 to about 6 mols of TMA per mol of palladium.

The mixed solution containing palladium nitrate and TMA was added to the hydrous precipitate of zirconium oxide in an amount sufficient to produce a wt/wt ratio of $Pd/ZrO_2$ in the final catalyst in the range of about 0.04 to about 0.20.

The solution containing palladium nitrate and TMA, and the precipitate of zirconium oxide, were masticated to produce a suspension of hydrous zirconia carrying adsorbed palladium. This suspension comprised a washcoat that was suitable for application to a metal strip.

The washcoat was applied with a brush, like paint. Alternatively, it could have been sprayed onto the substrate like paint. Each coating was dried and calcined. A corrugated strip of metal foil one inch wide and 36 inches long was coated on both sides with a standard weight (about 1.6 gm) of catalyst. The strip was folded upon itself at its midpoint and wound into a compact spiral.

The activity of the catalyst was measured by flowing a standard mixture of natural gas (methane) and air, while ramping up the inlet temperature. The catalyst was thus tested for its effectiveness in catalyzing the conversion of methane to carbon dioxide and water.

The activity of the catalyst is measured in terms of the conversion ratio of the catalyst. The conversion ratio, or simply "conversion" is the percentage of the fuel that is converted in the above-described reaction. The conversion can be determined by measuring the temperature increase of the combustion gas passing through the catalyst, and dividing by the calculated temperature increase that would be expected if the catalytic conversion were complete. In general, the conversion can be deemed an indication of the desirability of the catalyst.

Figure 1:
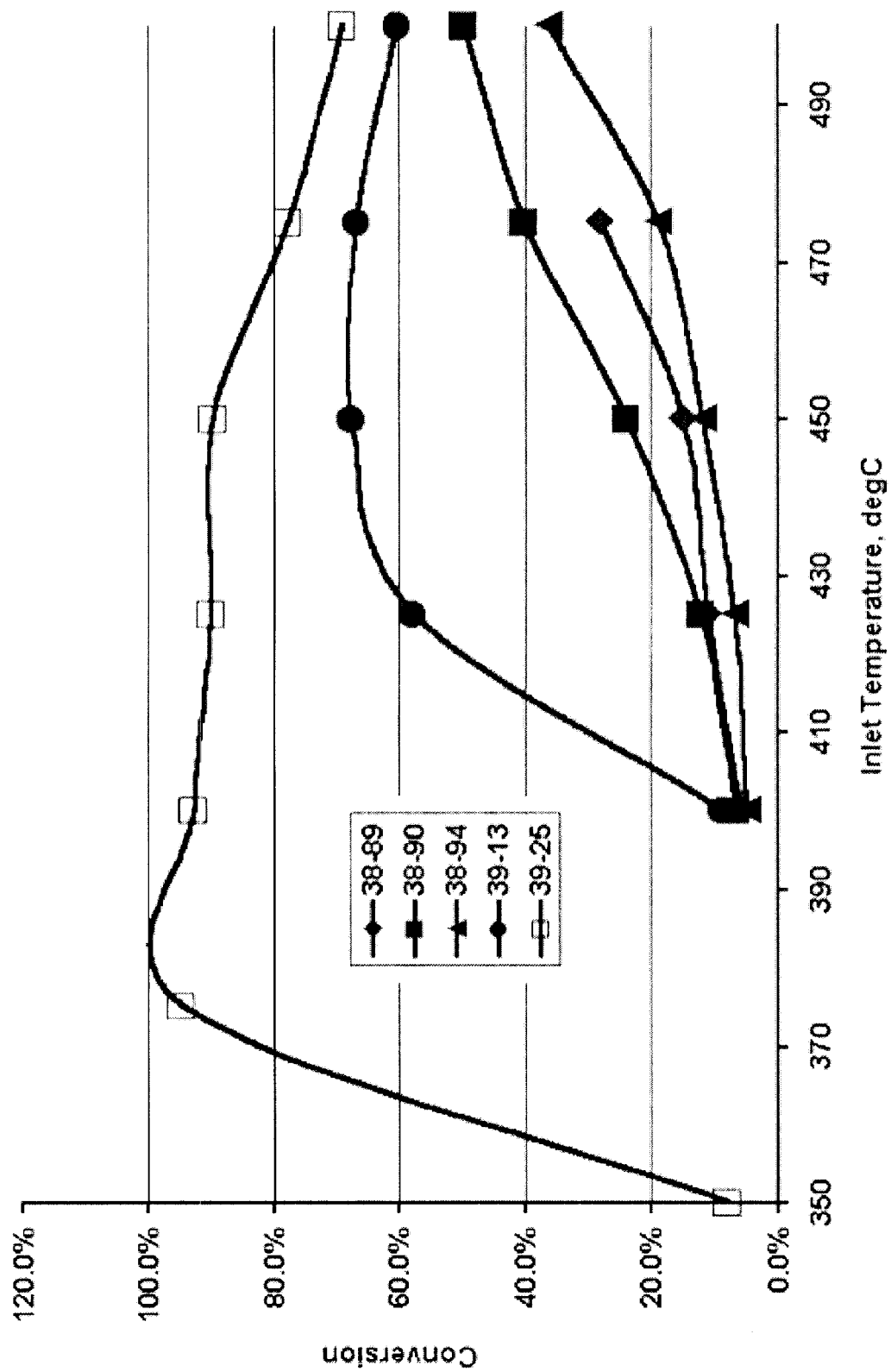
FIG. 1 provides a graph of conversion versus inlet temperature, illustrating the performance of various catalysts made according to the present invention.
Figure 2:
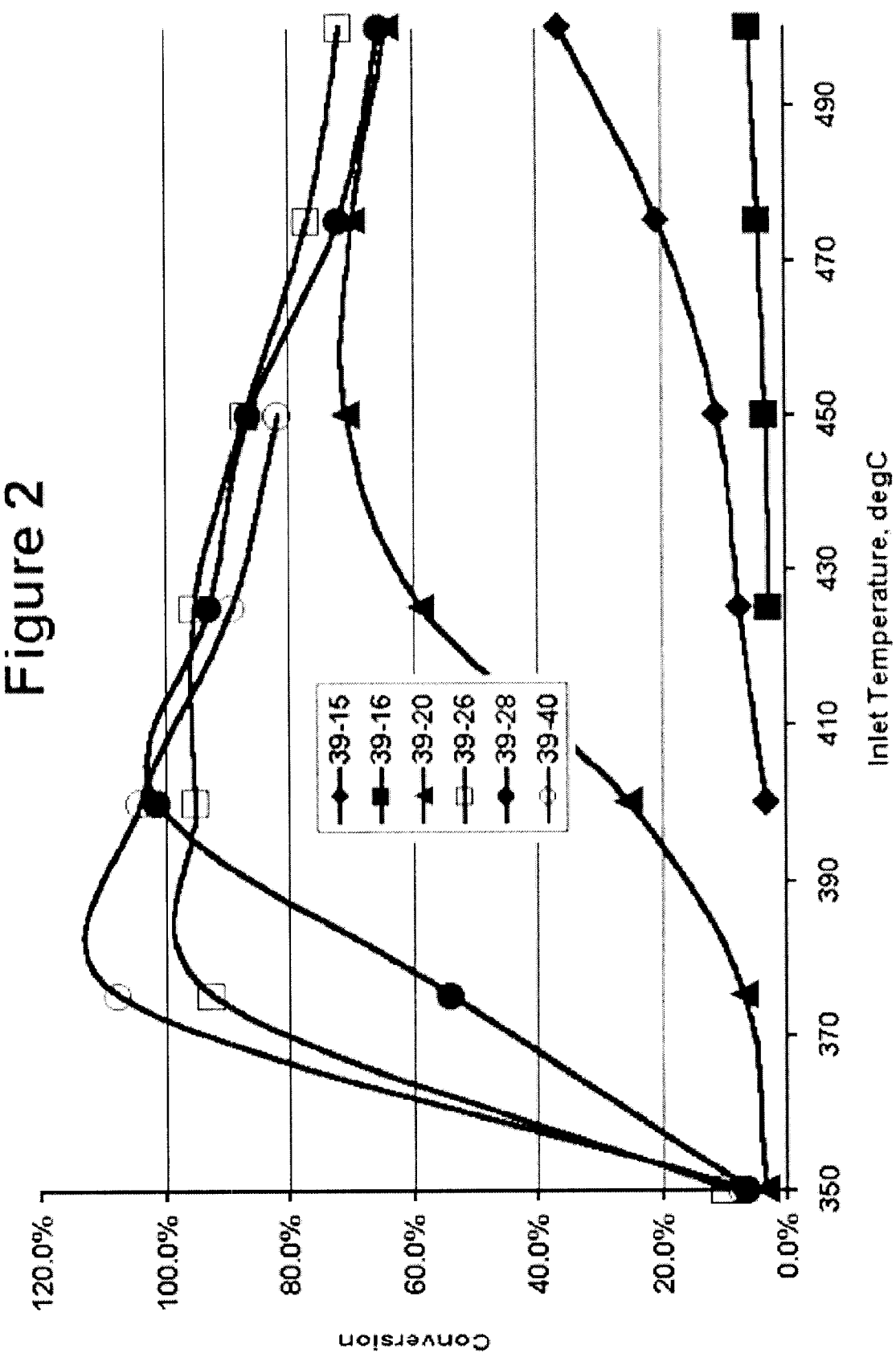
FIG. 2 provides a graph similar to FIG. 1, showing the effect of adding increased quantities of nitric acid to the composition of the present invention.
Figure 3:
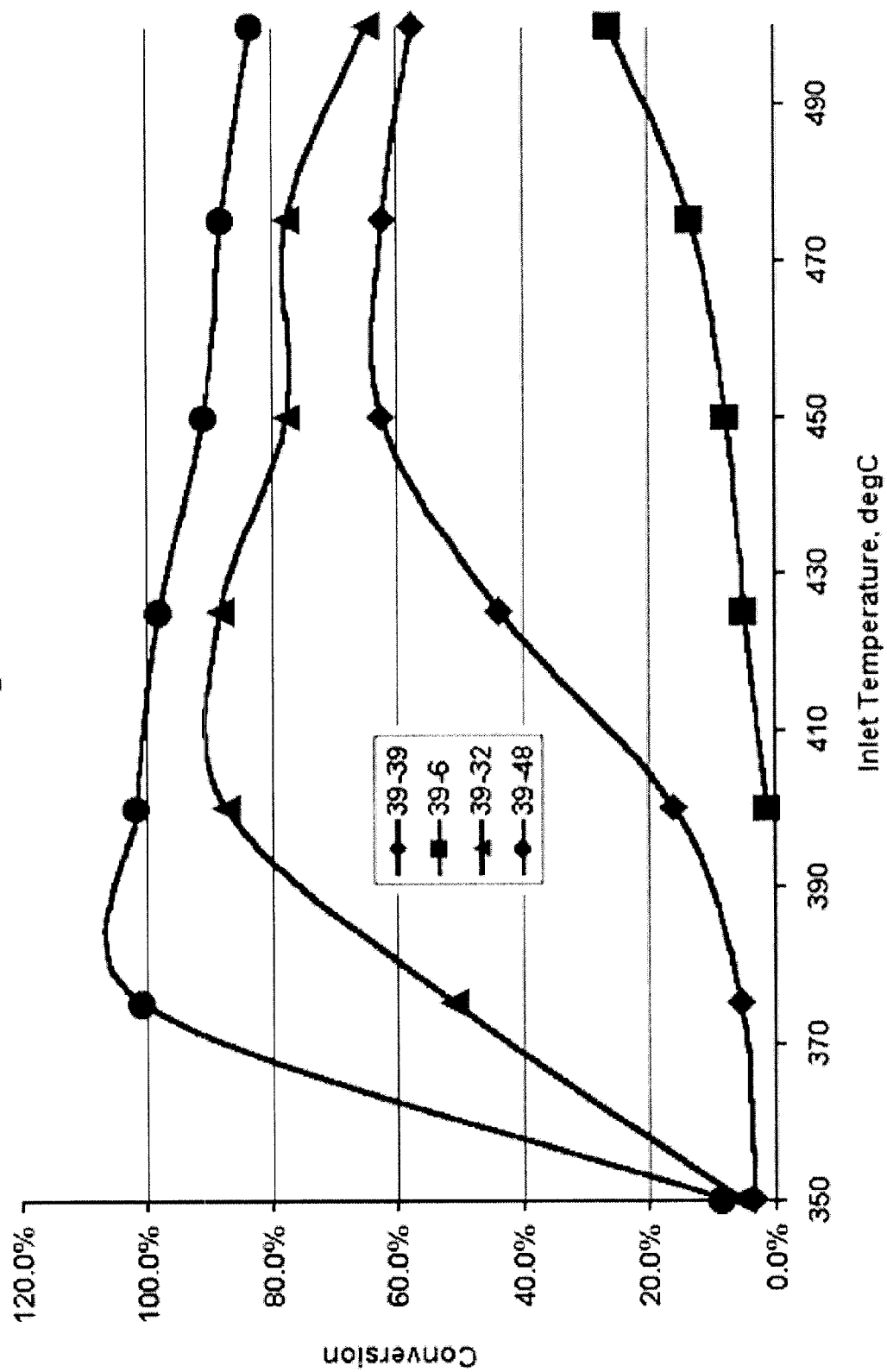
FIG. 3 provides a graph similar to FIG. 1, showing the effect of varying the amount of palladium in the composition of the present invention.

Table 1 lists the catalysts that were tested, using the procedure described in Example 1, to demonstrate the catalysts of the present invention. FIGS. 1–3 show the test results. In each of these figures, the conversion is plotted against the inlet temperature. The conversion is calculated from the temperature rise through the catalyst, as stated above.

TABLE 1

| Catalyst No. | Mol Free Acid per Mol Pd | Mol TMA Added per Mol Pd | Mol HNO$_3$ Added per Mol Pd | Wt Pd per Wt ZrO$_2$ |
|---|---|---|---|---|
| 38-89 | 2.6 | 1.2 | 0 | 0.12 |
| 38-90 | 2.6 | 1.6 | 0 | 0.12 |
| 38-94 | 2.6 | 0.6 | 0 | 0.12 |
| 39-13 | 2.6 | 1.6 | 1.6 | 0.12 |
| 39-15 | 3.2 | 1.6 | 1.6 | 0.12 |
| 39-16 | 3.2 | 0 | 0 | 0.12 |
| 39-20 | 3.2 | 3.0 | 3.0 | 0.12 |
| 39-25 | 2.6 | 3.0 | 3.0 | 0.12 |
| 39-26 | 3.2 | 6.0 | 6.0 | 0.12 |
| 39-28 | 3.2 | 3.0 | 3.0 | 0.12 |
| 39-40 | 3.2 | 6.0 | 6.0 | 0.12 |
| 39-6 | 2.6 | 0.8 | 0 | 0.08 |
| 39-32 | 3.2 | 6.0 | 6.0 | 0.08 |
| 39-48 | 3.2 | 6.0 | 6.0 | 0.16 |

FIG. 1 shows a modest increase in catalytic activity as the mols of TMA per mol of Pd is stepped up through 0.6, 1.2, and 1.6 in catalyst 38-94, 38-89, and 38-90, respectively. In the three catalysts mentioned above, no nitric acid was added along with the TMA, so that the TMA must have reduced the acidity of the solution.

Beginning with catalyst 39-13, the TMA in the solution was neutralized with an equal number of mols of HNO$_3$. Addition of HNO$_3$ increased the activity of the catalyst.

In catalyst 39-25, the ratio mol TMA/mol Pd was increased to 3.0 and the activity increased again.

All the catalysts shown in FIG. 1 were made with palladium nitrate solution that contained 2.6 mols of free acid per mol of Pd. Free acid is the acid determined by titrating to a pH of about 6.6.

For the catalysts shown in FIG. 2, the solution contained 3.2 mols of acid per mol of Pd.

When TMA is used, the amount of free acid does not affect the activity. Tetraethyl and tetraethanol were tried also, but were no more effective than tetramethylammonium.

FIG. 2 shows that:
1. When no TMA is added to the palladium nitrate, the activity is zero (catalyst 39-16).
2. Adding 1.6 mol TMA/mol Pd increases the activity moderately, just as before (catalyst 39-15).
3. Adding 3.0 mol TMA/mol Pd increases the activity markedly, just as before (catalyst 39-20).
4. Adding 6.0 mol TMA/mol Pd again increases the activity markedly (catalyst 39-26).
5. Catalyst 39-28 was made with 3.0 mols of tetrabutylammonium ion instead of tetramethylammonium, and it is seen that tetrabutyl is more effective than tetramethyl.

FIG. 3 shows that the strong activating effect of TMA persists when the catalysts contain 8% or even only 4% Pd. FIG. 3 also shows that increasing the palladium loading from 12 to 16% has little effect.

The commercial way to make palladium nitrate, required in the method of the present invention, is to dissolve palladium in concentrated nitric acid. When made this way, the nitrate solution can contain a high portion of the complex {Pd(NO$_3$)$_2$(H$_2$O)$_2$}, which is not ionized. This complex is described in the Journal of the Chemical Society (London) 1957, page 4222.

It is preferred that the number of mols of nitric acid be approximately equal to the number of mols of TMA. If the acidity is too high, the resulting washcoat becomes brittle. If the palladium nitrate has higher acidity, one should reduce the amount of added acid.

The palladium nitrate used in the above Example 1 was a sample obtained from Alfa Aesar, stock 12621. It is clear, from the data shown above, that the palladium-zirconium catalyst has almost zero activity unless TMA (or another alkyl ammonium ion) is added.

In addition to promoting the activity of the catalyst, another benefit of TMA is that it makes it feasible to make the catalyst using palladium nitrate from any source.

The following is an explanation of the chemical mechanism believed to underlie the present invention. The exact chemical mechanism is not fully understood, however, and the invention should not be deemed limited by the following comments.

It is likely that the alkylammonium ion is complexing with the palladium ion, and the complex is absorbing on the hydrous zirconium oxide. Possibly the complex is absorbing more strongly than does the uncomplexed palladium ion, thereby increasing the activity. The complex of palladium ion with the alkylammonium ion is quite strong. U.S. Pat. No. 4,162,231 describes a process wherein the alkyl group was tricaprylmethyl. This was dissolved in a liquid hydrocarbon, and this hydrocarbon solution was used to extract palladium ion from a highly acid water solution. The results summarized in Example 1 suggest an advantage of a larger alkyl group, insofar as tetrabutyl was more effective than tetramethyl.

In the examples described above, in each case where nitric acid was added, the number of mols of nitric acid was equal to the number of mols of TMA. The same result would be obtained by adding the nitrate salt of TMA and eliminating the nitric acid. The same applies for the nitrate salts of the other tetraalkylammonium ions. Other salts could be used. The perchlorate salt is preferred because perchlorate ion does not form complexes. For the present application, it is important that the palladium ion form a complex with the tetraalkylammonium ion and nothing else.

The reader skilled in the art will recognize that the invention can be modified, insofar as the proportions described above are approximate. Such modifications should be considered within the spirit and scope of the following claims.

What is claimed is:

1. A method of making a catalyst comprising palladium and zirconium, comprising:
   a) raising a pH of a solution of ZrO(NO$_3$)$_2$ to a value between about 4 and 5, to precipitate a hydrous zirconium oxide,
   b) combining a solution of palladium nitrate and a solution of an alkyl ammonium hydroxide,
   c) mixing the result of step (b) with the hydrous zirconium oxide of step (a) to form a suspension, said suspension comprising a catalyst composition comprising palladium and zirconium.

2. The method of claim 1, wherein the alkyl ammonium hydroxide is selected to be tetramethylammonium hydroxide.

3. The method of claim 1, wherein the alkyl ammonium hydroxide is selected to be tetrabutylammonium hydroxide.

4. The method of claim 1, wherein the alkyl is selected from the group consisting of tetraethyl, tetramethyl, tetrabutyl, and tetraethanol.

5. The method of claim 1, wherein step (b) comprises selecting an amount of the alkyl ammonium hydroxide such that the ratio of mols of alkyl ammonium hydroxide to mols of palladium is in a range of about 1 to about 6.

6. The method of claim 1, further comprising adding nitric acid to the solution of palladium nitrate, in an amount such that a number of mols of nitric acid is approximately equal to a number of mols of the alkyl ammonium hydroxide.

7. The method of claim 1, further comprising adding a nitrate salt of an alkyl ammonium ion, in an amount such that a number of mols of the nitrate salt is approximately equal to a number of mols of the alkyl ammonium hydroxide.

8. The method of claim 1, wherein the ratio of weight of palladium to weight of zirconium oxide, in the final suspension, is selected to lie within a range of about 0.04 to about 0.20.

9. A method of making a catalyst comprising palladium and zirconium, comprising:
   a) combining a solution of palladium nitrate with a solution of an alkyl ammonium hydroxide,
   b) mixing the combination prepared in step (a) with a hydrous zirconium oxide, so as to form a suspension, wherein the suspension comprises a catalyst comprising palladium and zirconium.

10. The method of claim 9, wherein the alkyl ammonium hydroxide is selected to be tetramethylammonium hydroxide.

11. The method of claim 9, wherein the alkyl ammonium hydroxide is selected to be tetrabutylammonium hydroxide.

12. The method of claim 9, wherein the alkyl is selected from the group consisting of tetraethyl, tetramethyl, tetrabutyl, and tetraethanol.

13. The method of claim 9, wherein step (b) comprises selecting an amount of the alkyl ammonium hydroxide such that the ratio of mols of alkyl ammonium hydroxide to mols of palladium is in a range of about 1 to about 6.

14. The method of claim 9, further comprising adding nitric acid to the solution of palladium nitrate, in an amount such that a number of mols of nitric acid is approximately equal to a number of mols of the alkyl ammonium hydroxide.

15. The method of claim 9, further comprising adding a nitrate salt of an alkyl ammonium ion, in an amount such that a number of mols of the nitrate salt is approximately equal to a number of mols of the alkyl ammonium hydroxide.

16. The method of claim 9, wherein the ratio of weight of palladium to weight of zirconium oxide, in the final suspension, is selected to lie within a range of about 0.04 to about 0.20.

17. A catalyst composition comprising a suspension including palladium nitrate, zirconium oxide, and an alkyl ammonium hydroxide.

18. The catalyst composition of claim 17, wherein the alkyl ammonium hydroxide is tetramethylammonium hydroxide.

19. The catalyst composition of claim 17, wherein the alkyl ammonium hydroxide is tetrabutylammonium hydroxide.

20. The catalyst composition of claim 17, wherein the alkyl is selected from the group consisting of tetraethyl, tetramethyl, tetrabutyl, and tetraethanol.

21. The catalyst composition of claim 17, wherein the alkyl ammonium hydroxide is present in an amount such that a ratio of mols of alkyl ammonium hydroxide to mols of palladium is in a range of about 1 to about 6.

22. The catalyst composition of claim 17, wherein the composition also comprises nitric acid in an amount such that a number of mols of nitric acid is approximately equal to a number of mols of the alkyl ammonium hydroxide.

23. The catalyst composition of claim 17, wherein the composition also comprises a nitrate salt of an alkyl ammonium ion, in an amount such that a number of mols of the nitrate salt is approximately equal to a number of mols of the alkyl ammonium hydroxide.

24. The catalyst composition of claim 17, wherein a ratio of weight of palladium to weight of zirconium, in the final suspension, is in a range of about 0.04 to about 0.20.

* * * * *